US008327588B2

(12) United States Patent
Seeger (10) Patent No.: US 8,327,588 B2
(45) Date of Patent: Dec. 11, 2012

(54) SILO CLOSURE

(75) Inventor: Christian Seeger, Munich (DE)

(73) Assignee: Christian Seeger, Munich (DE)

( * ) Notice: Subject to any disclaimer, the term of this patent is extended or adjusted under 35 U.S.C. 154(b) by 72 days.

(21) Appl. No.: 12/925,739

(22) Filed: Oct. 28, 2010

(65) Prior Publication Data

US 2011/0094164 A1  Apr. 28, 2011

(30) Foreign Application Priority Data

Oct. 28, 2009  (DE) .................. 20 2009 014 547

(51) Int. Cl.
*E04B 1/34* (2006.01)
(52) U.S. Cl. ......... 52/3; 52/63; 52/222; 52/192; 52/2.14
(58) Field of Classification Search ................. 52/223.3, 52/2.13, 2.14, 3, 63, 192, 222, 710; 4/498–500, 4/503; 100/67, 68; 99/646 S
See application file for complete search history.

(56) References Cited

U.S. PATENT DOCUMENTS

| | | | | | |
|---|---|---|---|---|---|
| 1,484,382 | A | * | 2/1924 | Allitt ................................ | 24/462 |
| 2,950,727 | A | * | 8/1960 | Dunn .............................. | 160/89 |
| 3,103,083 | A | * | 9/1963 | Seeger ............................. | 52/63 |
| 3,757,479 | A | * | 9/1973 | Martinez ........................ | 52/222 |
| 3,803,671 | A | * | 4/1974 | Stuppy et al. .................. | 24/460 |
| 3,928,897 | A | * | 12/1975 | Tombu ............................ | 24/462 |
| 3,929,178 | A | * | 12/1975 | Hickey ......................... | 206/524.8 |
| 4,057,095 | A | * | 11/1977 | Hirota ............................. | 160/392 |
| 4,189,880 | A | * | 2/1980 | Ballin .............................. | 52/202 |
| 4,231,141 | A | * | 11/1980 | Derrick et al. ................. | 24/462 |
| 4,316,308 | A | * | 2/1982 | Chatelain ........................ | 24/335 |
| 4,370,792 | A | * | 2/1983 | Watts ............................ | 29/407.1 |
| 4,566,236 | A | * | 1/1986 | Pound ............................. | 52/222 |
| 4,638,532 | A | * | 1/1987 | Yang et al. ..................... | 24/462 |
| 4,790,037 | A | * | 12/1988 | Phillips .......................... | 4/499 |
| 4,817,655 | A | * | 4/1989 | Brooks ........................... | 135/121 |
| 4,949,523 | A | * | 8/1990 | Kassem ........................... | 52/713 |
| 5,209,029 | A | * | 5/1993 | Foerst ............................. | 52/63 |
| 5,224,306 | A | * | 7/1993 | Cramer ........................... | 52/63 |
| 5,535,560 | A | * | 7/1996 | Fligg ............................... | 52/222 |
| 5,581,966 | A | * | 12/1996 | Fligg ............................ | 52/404.3 |
| 5,752,297 | A | * | 5/1998 | Ramey ........................... | 24/462 |
| 2005/0102915 | A1 | * | 5/2005 | Echtler ........................... | 52/63 |

FOREIGN PATENT DOCUMENTS

| | | |
|---|---|---|
| DE | 72 06 998 U | 5/1972 |
| DE | 25 52 776 B1 | 11/1975 |
| DE | 26 41 789 A1 | 9/1976 |
| DE | 38 39 072 A1 | 11/1988 |
| DE | 38 42 089 A1 | 12/1988 |
| DE | 101 23 723 A1 | 5/2001 |
| FR | 2575243 A1 * | 6/1986 |

* cited by examiner

*Primary Examiner* — Robert Canfield
*Assistant Examiner* — Babajide Demuren
(74) *Attorney, Agent, or Firm* — Von Rohrscheidt Patents (57) ABSTRACT

In order to improve a retentions force of a silo closure, patterns with protrusions and recesses are proposed at least on insides of a support profile in particular portions, preferably also on outsides of a support hose and/or at least on one of the outsides of a cover foil.

21 Claims, 5 Drawing Sheets

SILO CLOSURE

RELATED APPLICATIONS

This patent application claims priority from and incorporates by reference German patent application DE 20 2009 014 547.6, filed on Oct. 28, 2009

FIELD OF THE INVENTION

The invention relates to a gas tight closure for silos, for example, forage silos configured in the agricultural field as drive silos or round silos in biogas systems or similar systems.

Silos of this type mostly include a base and walls made from concrete and possibly made from steel and shall be closed gas tight after being filled with material to prevent $CO_2$ from escaping and to prevent from air getting in.

BACKGROUND OF THE INVENTION

For this purpose it is already known in principle to produce a gas tight silo closure of this type in that a support profile is fixated in a the top side of a circumferential side wall, wherein the support profile is open in an upward direction, has an undercut, and thus expands in downward direction. After placing an edge portion of a cover foil that covers the silo into the support profile a support hose is inserted into the support profile and pressurized, typically through compressed air from an inside.

Thus, the cover foil is clamped and supported gas tight between the support profile and the support hose.

Thus, also two cover foils placed on top of each other can be used, in particular when air is introduced there between either to keep the upper cover foil taunt, or so that the intermediary air layer acts as additional insulation.

When the size of the surfaces to be covered with the cover foils increases, the forces impacting the silo closures increase on the one hand.

Furthermore also the requirements for the tightness factor of the silo closure increase.

BRIEF SUMMARY OF THE INVENTION

Thus, it is the object of the invention to improve a silo closure of this type in order to achieve higher retaining forces and simple handling characteristics for low production complexity and low production cost.

The object is accomplished through the features of a silo closure including a trapezoid support profile and an inflatable support hose disposed in the trapezoid support profile and configured for fixating at least one cover foil disposed between the trapezoid support profile and the inflatable support hose. The trapezoid support profile includes an opening in a shorter side of two parallel sides of the trapezoid support profile, and the opening is defined by two bends of free arms of the trapezoid support profile. Additionally, the two bends are oriented towards the opening in a convex manner, and support profile protrusions and support profile recesses are provided at inward oriented slanted surfaces of the free arms and also at inward oriented convex bent surfaces of the two bends of the opening of the trapezoid support profile.

Further advantageous embodiments can be derived from the following taken alone or in any suitable combination:

further including support hose protrusions and support hose recesses provided on outer surfaces of the inflatable support hose, wherein the support hose protrusions and the support hose recesses can interact with respect to height, distance and/or shape with the support profile protrusions and the support profile recesses on an inside of the trapezoid support profile;

the support profile protrusions and the support profile recesses and/or the support hose protrusions and the support profile recesses are line shaped grooves and ridges extending in a longitudinal direction;

the support hose protrusions and the support hose recesses are provided over an entire circumference and over an entire length of the inflatable support hose;

the support profile protrusions and the support profile recesses are provided in the trapezoid support profile in a medium height portion of the inward oriented slanted surfaces of the free arms and in the lower half of the inward oriented convex bent surfaces oriented towards the opening;

the trapezoid support profile includes support protrusions on outsides of the inward oriented slanted surfaces of the trapezoid support profile, and the support protrusions are sized larger at least by a factor of 5 to 10, with respect to height and/or distance, than the support profile protrusions on the inside of the trapezoid support profile and have a rectangular shape and become thicker towards their free ends;

the cover foil includes cover foil protrusions and cover foil recesses at least on one outside of the cover foil, in particular on both outsides of the cover foil, and the cover foil protrusions and cover foil recesses can interact in a form locking manner with respect to height, shape and/or distance with the support profile protrusions and support profile recesses and/or the support hose protrusions and support hose recesses;

the cover foil protrusions and the cover foil recesses are punctiform protrusions on an outside of the cover foil, configured as semicircular knobs or cones with a circular base surface, which are arranged in a rectangular or diamond shaped grid;

the cover foil protrusions and cover foil recesses do not include inverse analogue protrusions or recesses on an opposite side, but a flat continuous portion of an outer surface of the cover foil is disposed opposite to each protrusion or recess;

the inflatable support hose has a circular cross section in unloaded condition and is made from a flexible, in particular expandable material;

the inflatable support hose in unloaded condition includes an outer diameter which is greater than a free opening of the trapezoid support profile, in particular greater than the smallest free distance between two inward oriented slanted surfaces of the trapezoid support profile; and the opening of the trapezoid support profile has a size of at the most 85%, better at the most 75% of the smallest distance of the inward oriented slanted surfaces of the trapezoid support profile; and wherein an inner angle between the inward oriented slanted surfaces and a base surface of the trapezoid support profile is at the most 75°, better at the most 65°; and a free inner space on the outside of a bend of the free end arm of the trapezoid support profile is at least as wide as a wall thickness of the trapezoid support profile; and the trapezoid support profile has a constant wall thickness along its cross section profile.

Since tensions in the cover foil always occur in the plane of the cover foil, the amount of static friction of surfaces of the support profile and of the cover foil on one side and on the other side of the support hose are of crucial importance for the maximum retaining force of the silo closure.

It is proposed according to the invention to increase the friction force through form locking.

On one side this is provided in that protrusions and recesses are provided at the inner surfaces of the support profile, wherein the cover foil contacts the inner surfaces during operation of the silo closure, wherein the protrusion press into the contacting outside of the cover foil and increase the retaining force.

These protrusions and recesses are provided in the inward oriented slanted surfaces of the trapezoid support profile and also at the inward oriented bent surfaces of the freely terminating arms of the support profile, therein from the location of the opening of the support profile to the center of the support profile, thus in turn in the portion of the bending surfaces where the contact pressure is operatively applied to the silo closure by the support hose.

Since the support hose is prevented from sliding out in particular through the bending surfaces in front of the smallest opening width of the support profile, disposing the protrusions and recesses in this location is particularly effective.

The cover foil, however, in practical applications will not contact the transition portion between the slanted surfaces and the bending surfaces, so that protrusions and recesses can be omitted in that location.

Protrusions and recesses are advantageously also provided on the outer surface of the support hose and thus configured, so that they can form lock in particular with respect to height, distance and/or shape of the protrusions and recesses with the protrusions and recesses on the insides of the support profile.

Though the cover foil is disposed between the support profile and the support hose, the protrusions and recesses can also be sized, so that even a flat non-profiled cover foil is wedged in a form locking manner between the alternating protrusions and recesses of the support hose on one side and the support profile on the other side.

In this case two protrusions disposed adjacent to one another should have at least a distance corresponding to the thickness of the support foil that is being used.

Another option is to arrange respective protrusions and recesses, thus in particular with respect to height, distance and/or shape corresponding to the one on the support hose and/or the support profile also on the outside, and more advantageously on both outsides of the cover foil.

This way the profiles on the outside of the cover foil can interact directly form locked with the profiles on the inside of the support foils and/or the outside of the support hose.

Advantageously the protrusions and recesses thus extend as line shaped ridges and grooves in longitudinal direction for the support profile and the support hose along the profile or the hose.

However since there is mostly no defined longitudinal orientation for the cover foils advantageously punctiform, for example, conical or semi spherical protrusions, are being used for the cover foil, wherein the protrusion are, for example, distributed in a grid shaped as a rectangle or in a diamond shaped grid over the entire surface of the cover foil.

Punctiform protrusions of this type on the cover foil can engage and be supported independently from an orientation of the cover foil relative to a longitudinal direction of the support hose and support profile, wherein the engagement is provided between the line shaped protrusions of the support hose and the support profile.

In case of protrusions and recesses also on at least one of the outsides of the cover foil, the cover foil shall advantageously not be run between the protrusions and recesses of support profile and the support hose in a meander shape, but they shall extend straight there between and shall only engage their protrusions and recesses with its protrusions and recesses.

For this purpose the protrusions and recesses on the support hose and/or the support profile and/or the cover foil are spaced apart by a much smaller amount than corresponding to the thickness of the cover foil for this solution.

In order to prevent in particular a meander shaped extension of the cover foil in particular in this case, care should also be taken that a protrusion on one side of the cover foil is not opposed by an analogous recess on the opposite side, but so that the outer surface of the cover foil passes straight through on the opposite side.

Another option is the protrusions on the two sides of the cover foil are in particular disposed at the locations corresponding to one another and also the recesses, so that it is reliably prevented that a protrusion and a respective recess are placed opposite to one another.

In order to also be able to receive the improved support force of the silo closure, the support profile itself has to be anchored in the receiving component in a particularly stable manner, thus typically in the upper face of the wall of the silo typically made from concrete.

For this purpose support protrusions are also configured on the outside of the freely terminating arms of the support profile, wherein the support protrusions are used for anchoring in the surrounding concrete.

The support protrusions based on their function are sized larger than the protrusions on the inside for supporting the cover foil at least by the factor 5, better by the factor 10 with respect to height and distance.

In particular along the length of the freely terminating arm only three to five of such support protrusions are configured, wherein the support protrusions in turn are configured continuously as line shaped support protrusions in a longitudinal direction of the support profile or as punctiform protrusions in longitudinal direction configured in series behind one another.

Advantageously the support protrusions include a cross section that expands towards their free end in order to facilitate even better anchoring in the surrounding concrete.

The employed support hose will advantageously have circular cross section in unloaded condition, wherein the support hose typically maintains the circular cross section in loaded condition without a surrounding component.

The support hose is made from a flexible preferably also slightly expandable material. This facilitates to press a support hose whose cross section in unloaded condition is greater than the free opening of the support profile, into the support profile without pressure due to the deformability of the support profile and to subsequently safely retain it through pressure loading in the support profile with the cover foil placed there between.

For this purpose the cross sectional surface of the support hose in loaded condition is not greater than 100%, in particular not greater than 120% of the free inner cross section surface of the support profile measured up to the smallest opening width of the support profile.

The convex bends at the ends of the free arms of the support profile also have a significant influence upon the achievable support force, wherein the convex bends are oriented towards the interior of the opening in the portion of the opening of the support profile.

The bends should be sized, so that the free opening of the support profile is 85% at the most, better 75% at the most of the smallest distance of the inner slanted surfaces of the support profile before the beginning of the bends.

Simultaneously the curvature radius of the outer surfaces of the bends should correspond to at least 1.1, times, better 1.2 times the wall thickness of the support profile in the portion of the bend, wherein the support profile advantageously besides the support protrusions has a constant wall thickness.

The inner angle between the slanted surfaces of the support profile and its base surface is 75° at the most, better 65° at the most for optimum retention.

Thus the free inner cavity on the outside of the bends at the ends of the free arms should correspond at least to the wall thickness of the support profile in this portion.

BRIEF DESCRIPTION OF THE DRAWINGS

Embodiments of the invention are subsequently described in more detail with reference to drawing figures, wherein.

DETAILED DESCRIPTION

Figure 1A:
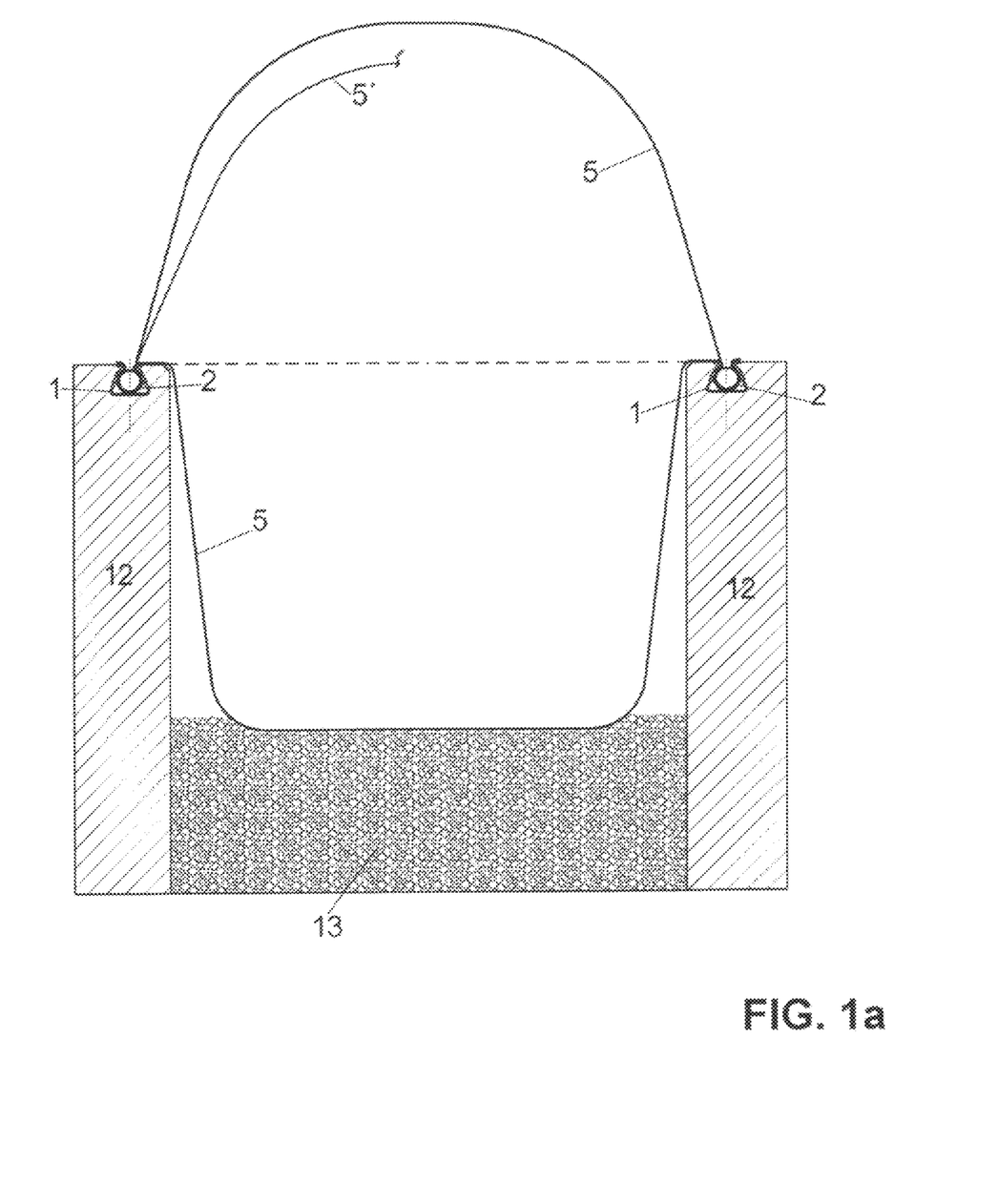
FIG. 1a illustrates a silo that is closed according to the invention in a cross sectional view.

FIG. 1a illustrates the application of a silo closure according to the invention at a drive silo or a round silo illustrated in a cross sectional view.

The silage 13 is stored on the base of the silo and is enclosed on all sides by side walls 12 protruding from the base, wherein the side walls are typically made from concrete. On the narrow top side 12a of the side walls the support profile 1 is received with the opening oriented in upward direction. The open top side of the silo is covered by a cover foil 5 or two cover foils 5, 5' placed on top of one another, whose lateral edges are disposed in the support profile 1 and are wedged therein through the pressurized support hose 2 which is disposed in the support profile 1.

The silo is initially often filled with piled silage 13 beyond the upper edge of the side 12a of the side walls 12 and then covered with the cover foil 5 which initially yields an upward arched cupola shape of the cover foil 5 which is even slightly inflated through the gases generated from the silage.

Through the increasing removal of silage 13 from the silo typically occurring during the winter the level of silage in the silo drops and analogously the cover foil 5 substantially contacting the silage moves further downward until it hangs loose into the silo in downward direction as also illustrated in FIG. 1a, wherein in case two cover foils 5, 5' are present this is the lower one 5' of the two.

It is the object of the invention not to let the gases, in particular gases including carbon like $CO_2$, escape from the silo. Therefore the cover foil 5 is gas tight at least not permeable for the gases to be retained and also the clamping of the edges of the cover foil 5 in the support profile 1 is gas tight. For this purpose the silo is closed gas tight over and over again also at the retrieval opening after the partial removal of the silage 13.

Figure 1B:
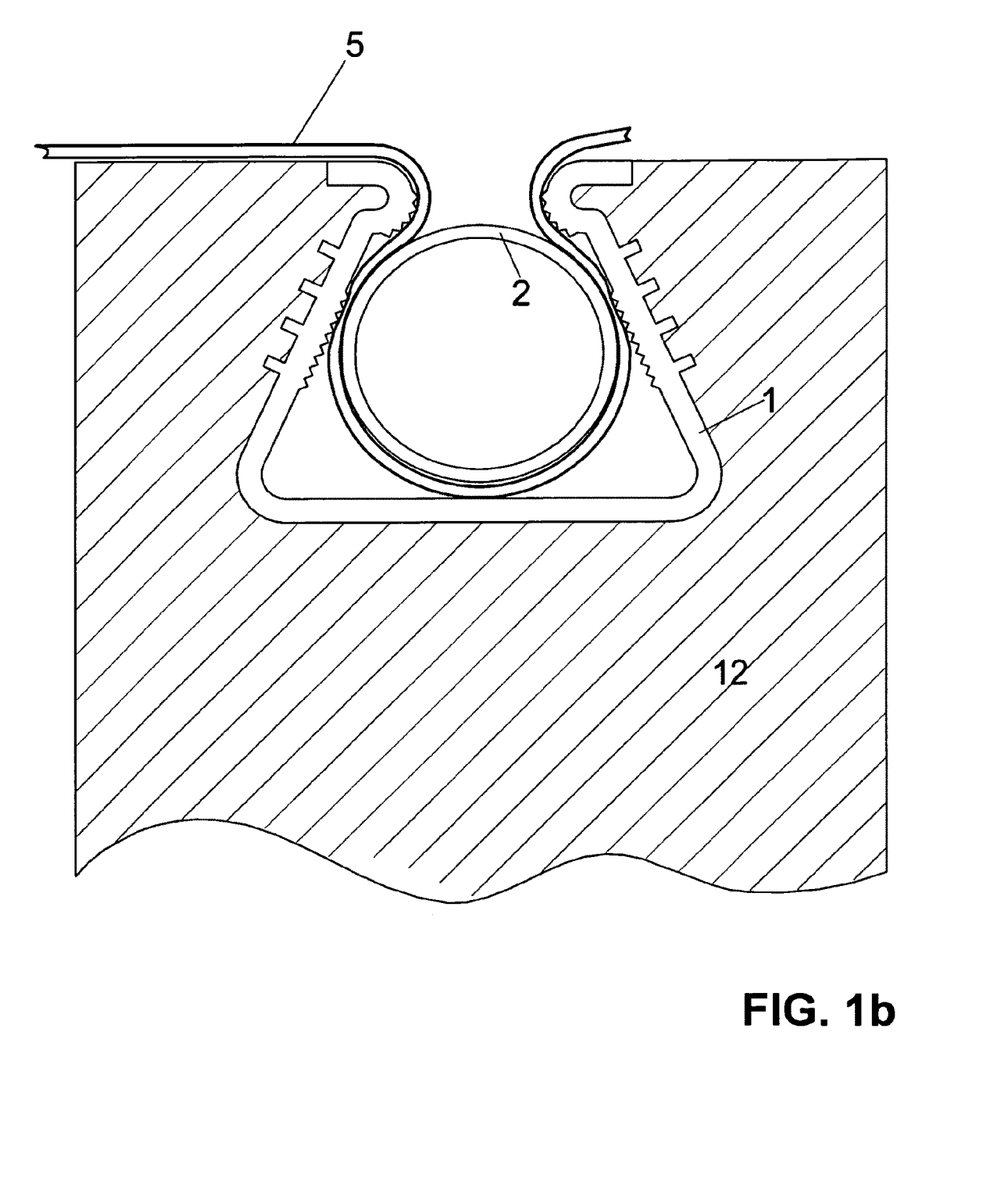
FIG. 1b illustrates a silo closure in an enlarged detail view.

FIG. 1b illustrates an enlarged cross section through the silo closure according to FIG. 1a.

Thus it is evident that the support hose 2 in inflated condition approaches approximately a circular cross section and thus does not contact with its entire surface at the surrounding cover foil 5 and thus indirectly at the surrounding support profile 1, but essentially at the inner surface of the base, thus the long parallel side 3b of the trapeze shaped support profile 1 and at the inner surfaces of the free terminating arms 14a, 14b and the lower portion of the inner surfaces of the bends 4a, 4b in which the free ends of the arms 14 terminate.

Figure 2A:
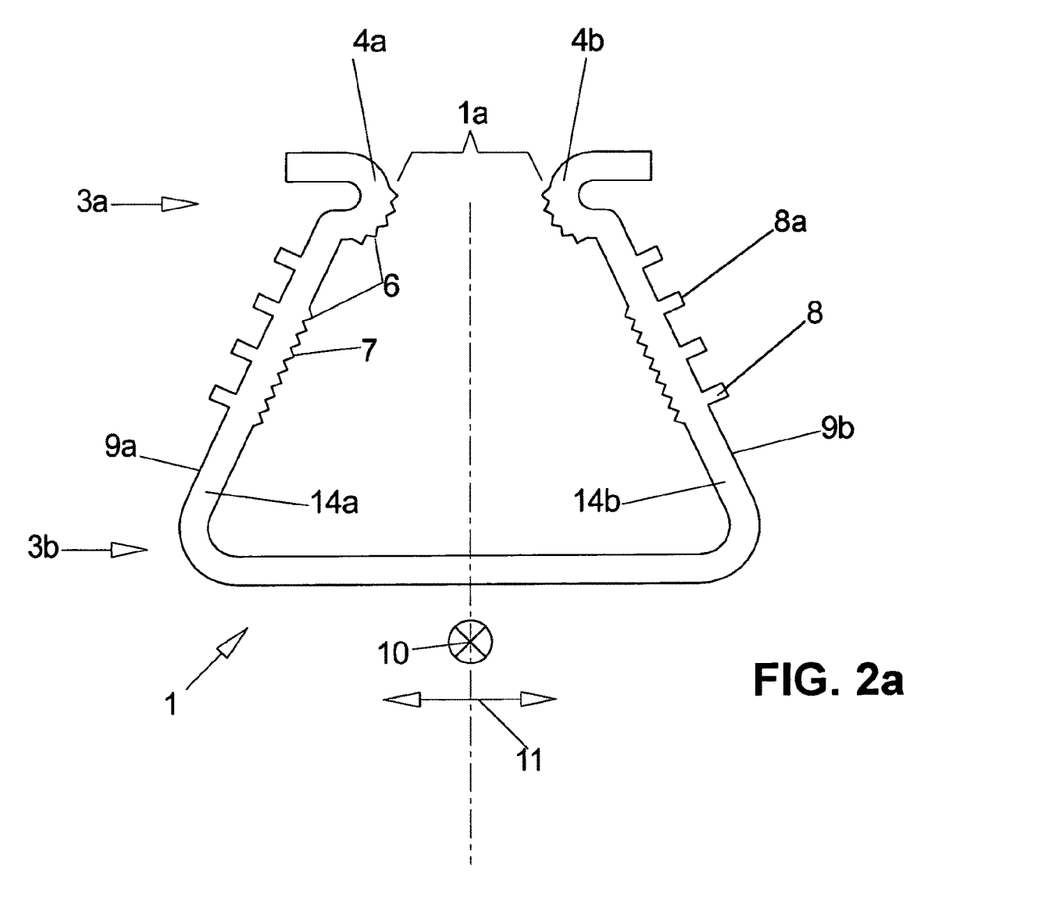
FIG. 2a illustrates the support profile of the silo closure by itself.
Figure 2B:
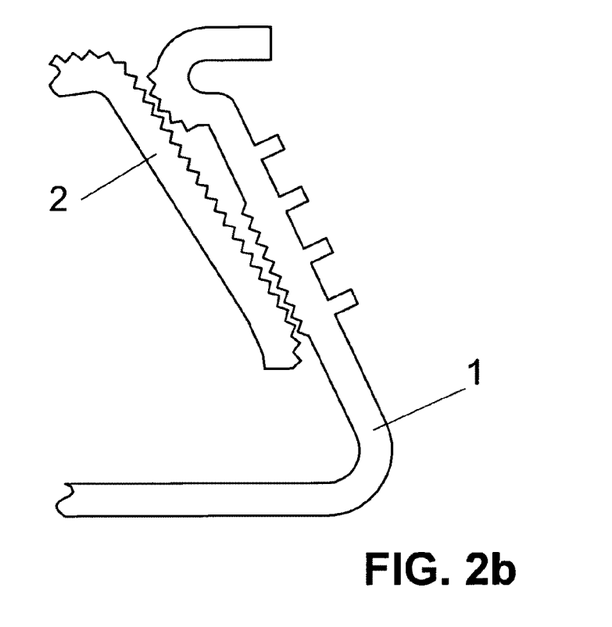
FIG. 2b illustrates an enlarged detailed illustration of a partial portion of the support profile with support hose.

FIG. 2a illustrates the support profile 1 in a cross sectional view by itself and illustrates it in FIG. 2b in an enlarged detail view of the free arm 14a with the bend 4a disposed there on, wherein the FIG. 2b additionally illustrates the portion of the support hose 2 disposed opposite to the inside of the support profile 1.

FIGS. 2a and 2b illustrate that a profile in the form of zigzag shaped protrusions 6 and recesses 7 are disposed on the insides of the free arms 14a, 14b at least in their center longitudinal portions and also on the inside of the bends 4a, 4b in the lower half, thus in the portion below the free opening 1a of the support profile.

An analogous profile is illustrated in FIG. 2b on the outside of the support hose 2 and advantageously over the entire circumference of the support hose 2.

Thus the profiles, thus the protrusions 6, 6' and the recesses 7, 7' extend advantageously over the entire length of support profile 1 and support profile 2 and are advantageously configured as line shaped protrusions extending in longitudinal direction 10 of these objects, thus line shaped ridges and grooves.

As illustrated in FIG. 2b the protrusions 6 and recesses 7 are not only configured identical at the bend 4a and at the free arm 14a, but also at the outside of the support hose 2a with respect to height, flank inclination, distance and the like so that the protrusions and recesses of the support hose 2 on the one hand and of the support profile 1 on the other hand can engage one another like a teething.

Figure 3A:
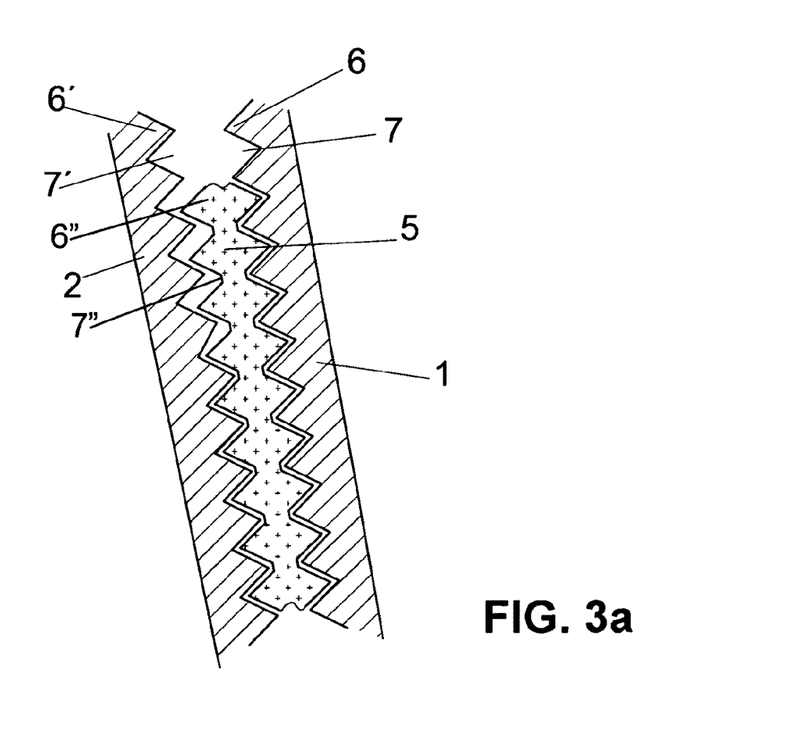
FIG. 3a and FIG. 3b illustrate enlarged detail views of the clamped cover foil.
Figure 3B:
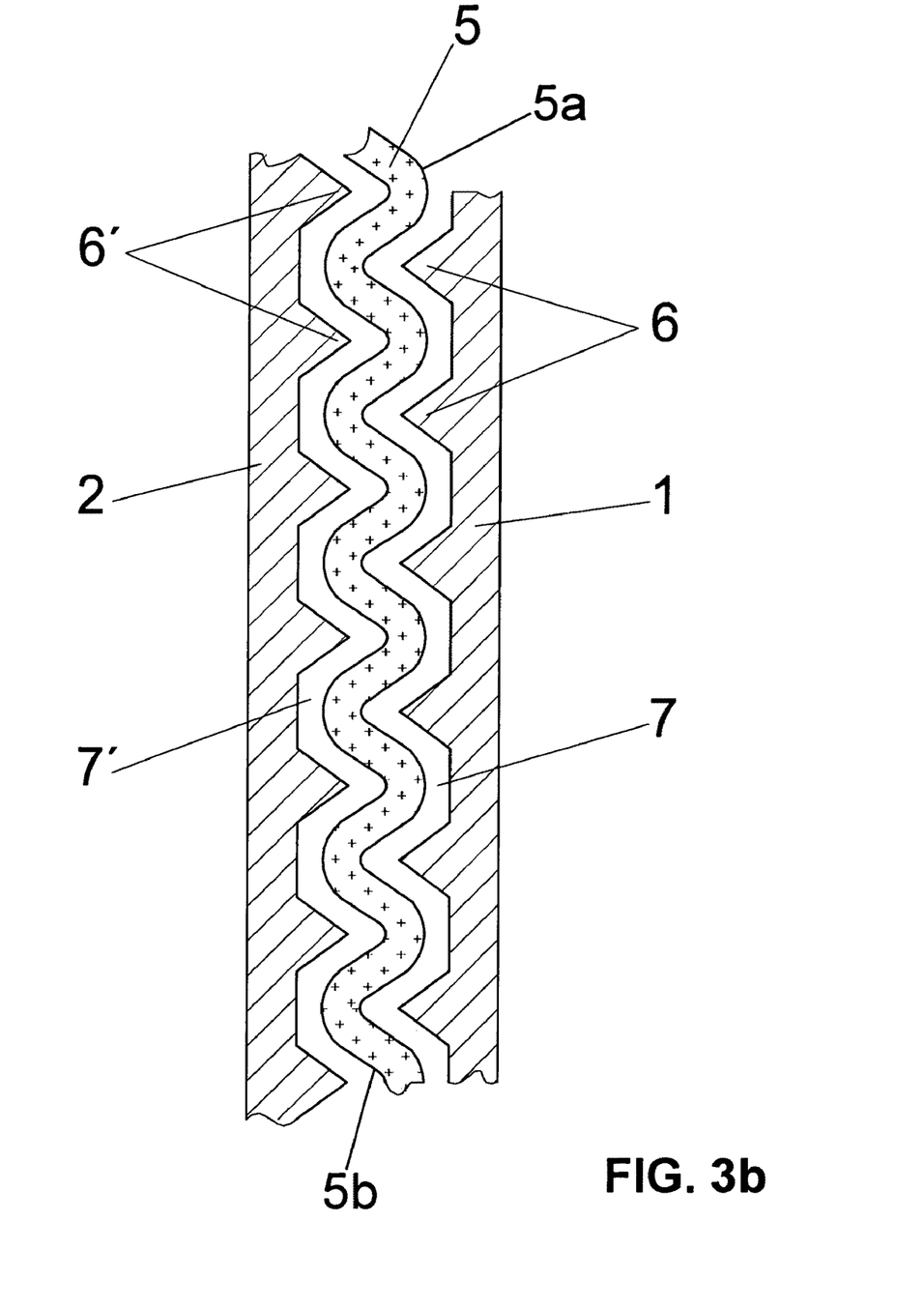

However in practical applications the cover foil 5 is disposed there between as illustrated in FIG. 3a and FIG. 3b.

The cover foil 5, however, is made from a flexible and therefore relatively soft material compared to the significantly harder material, for example, of the support profile 1 which is made from hard plastic material or even metal in particular metal configured as a drawn profile and in which the protrusions 6 are configured integral with the rest of the support profile 1 and are in particular made from the same material.

The protrusions 6' on the outside of the support hose 2 thus are advantageously made from the same material as the support hose 2 which is made from a flexible relatively soft material like the cover foil 5, however, the protrusions 6' on the outside of the support hose 2 can also be made from another material which is much harder than the support hose 2, in particular they can be configured as a separate outer layer.

In particular, when the protrusions 6, 6' on the support profile 1 and/or the support hose 2 are made from a harder material than the cover foil 5, they dig into the elastic surface of the cover foil 5 in a form locking manner due to the hardness of the protrusions when respective pressure is applied in the support hose 2, wherein the cover foil 5 in unloaded state can have two flat outsides without protrusions and recesses, wherein the outsides extend parallel to one another.

This simplest case is not illustrated in either FIG. 3a or FIG. 3b.

The outsides 9a, 9b of the cover foil 5 in turn, however, can also include protrusions 6" and recesses 7" as illustrated in FIG. 3a, and thus protrusions and recesses which fit together with respect to height and/or other parameters with the protrusions and recesses 6, 6', 7, 7' of the support profile 1 and of the support hose 2 and engage the support hose 2 in a form locking manner.

In this case, advantageously the protrusions 6" are disposed on the outer surfaces 9a, 9b of the cover foil 5 always at corresponding positions of the two outer surfaces 9a, 9b. Advantageously, these are punctiform, thus cone shaped or pyramid shaped protrusions, since there is no defined longitudinal direction for the cover foil 5, but the foil is typically individually glued together and trimmed at the edges for a particular silo.

These punctiform protrusions and recesses 6", 7" on the outer surfaces 9a, 9b of the cover foil 5 thus engage irrespective of the orientation of the foil in protrusions and recesses 6', 6" or 7', 7" with approximately equal height of the contacting surfaces of support hose 2 and support profile 1 in a form locking manner and increase the load bearing capability of the clamped connection which is always only tension loaded in the direction of the plane of the cover foil 5.

FIG. 3b by comparison illustrates another solution, thus only the support profile 1 and the support hose 2 have protrusions 6', 6" and recesses 7', 7" at their surfaces facing one another, wherein the cover foil 5 has planar outer surfaces 9a, 9b without protrusions and recesses.

However, the protrusions and recesses on the support profile 1 and the support hose 2 are sized and offset, so that they do not dig into the surface of the cover foil 5 anymore, but so that the cover foil 5 meanders between the protrusions and recesses of the support profile and the support hose.

In this case, the protrusions 6, 6' and the recesses 7, 7' can advantageously also be rounded according to the maximum possible bending radius of the cover foil 5 which is being used.

REFERENCE NUMERALS AND DESIGNATIONS

1 support profile
1a opening
2 support hose
3a, 3b parallel sides
4a, 3b bend
5 cover foil
5a, 5b outside of cover foil
6 support profile protrusion
7 support profile recess
6' support hose protrusion
7' support hose recess
6" cover foil protrusion
7" cover foil recess
8 support protrusion
8a free end
9a, 9b outside of the free arm
10 longitudinal direction
11 transversal direction
12 sidewall
12a topside
13 silage
14a, 14b free arm

What is claimed is:

1. A silo closure, comprising:
   a trapezoid support profile; and
   an inflatable support hose disposed in the trapezoid support profile and configured for fixating at least one cover foil disposed between the trapezoid support profile and the inflatable support hose,
   wherein the trapezoid support profile includes an opening in a shorter side of two parallel sides of the trapezoid support profile,
   wherein the opening is defined by two bends of free arms of the trapezoid support profile, wherein the two bends are oriented towards the opening in a convex manner,
   wherein support profile protrusions and support profile recesses are provided at inward oriented slanted surfaces of the free arms and also at inward oriented convex bent surfaces of the two bends of the opening of the trapezoid support profile, and wherein the support profile protrusions press into a contacting outside of the at least one cover foil and increase a retaining force.

2. The silo closure according to claim 1, further comprising support hose protrusions and support hose recesses provided on outer surfaces of the inflatable support hose, wherein the support hose protrusions and the support hose recesses can interact with respect to height, distance or shape with the support profile protrusions and the support profile recesses on an inside of the trapezoid support profile.

3. The silo closure according to claim 2, wherein the support profile protrusions and the support profile recesses or the support hose protrusions and the support hose recesses are line shaped grooves and ridges extending in a longitudinal direction.

4. The silo closure according to claim 2, wherein the support hose protrusions and the support hose recesses are provided over an entire circumference and over an entire length of the inflatable support hose.

5. The silo closure according to claim 1, wherein the support profile protrusions and the support profile recesses are provided in the trapezoid support profile in a medium height portion of the inward oriented slanted surfaces of the free arms and in the lower half of the inward oriented convex bent surfaces oriented towards the opening.

6. The silo closure according to claim 1, wherein the trapezoid support profile includes support protrusions on outsides of the inward oriented slanted surfaces of the trapezoid support profile, and wherein the support protrusions are sized larger at least by a factor of 5, with respect to height or distance, than the support profile protrusions on the inside of the trapezoid support profile and have a rectangular shape and become thicker towards their free ends.

7. A silo closure, comprising:
   a trapezoid support profile; and
   an inflatable support hose disposed in the trapezoid support profile and configured for fixating at least one cover foil disposed between the trapezoid support profile and the inflatable support hose,
   wherein the trapezoid support profile includes an opening in a shorter side of two parallel sides of the trapezoid support profile,
   wherein the opening is defined by two bends of free arms of the trapezoid support profile, wherein the two bends are oriented towards the opening in a convex manner,
   wherein support profile protrusions and support profile recesses are provided at inward oriented slanted surfaces of the free arms and also at inward oriented convex bent surfaces of the two bends of the opening of the trapezoid support profile, and
   wherein the support profile protrusions press into a contacting outside of the at least one cover foil and increase a retaining force,
   wherein the cover foil includes cover foil protrusions and cover foil recesses at least on one outside of the cover foil, and wherein the cover foil protrusions and cover foil recesses can interact in a form locking manner with respect to height, shape or distance with the support profile protrusions and support profile recesses or the support hose protrusions and support hose recesses.

8. The silo closure according to claim 7, wherein the cover foil protrusions and the cover foil recesses are punctiform protrusions on an outside of the cover foil, configured as semicircular knobs or cones with a circular base surface, which are arranged in a rectangular or diamond shaped grid.

9. The silo closure according to claim 7, wherein the cover foil protrusions and cover foil recesses do not include inverse analogue protrusions or recesses on an opposite side, but a flat continuous portion of an outer surface of the cover foil is disposed opposite to each protrusion or recess.

10. The silo closure according to claim 1, wherein the inflatable support hose has a circular cross section in unloaded condition and is made from a flexible material.

11. The silo closure according to claim 1, wherein the inflatable support hose in unloaded condition includes an outer diameter which is greater than a free opening of the trapezoid support profile.

12. The silo closure according to claim 1, wherein the opening of the trapezoid support profile has a size of at the most 85% of the smallest distance of the inward oriented slanted surfaces of the trapezoid support profile.

13. The silo closure according to claim 1, wherein an inner angle between the inward oriented slanted surfaces and a base surface of the trapezoid support profile is at the most 75°.

14. The silo closure according to claim 1, wherein a free inner space on the outside of a bend of the free end arm of the trapezoid support profile is at least as wide as a wall thickness of the trapezoid support profile.

15. The silo closure according to claim 1, wherein the trapezoid support profile has a constant wall thickness along its cross section profile.

16. The silo closure according to claim 1, wherein the opening of the trapezoid support profile has a size of at the most 75% of the smallest distance of the inward oriented slanted surfaces of the trapezoid support profile.

17. The silo closure according to claim 1, wherein an inner angle between the inward oriented slanted surfaces and a base surface of the trapezoid support profile is at the most 65°.

18. The silo closure according to claim 1, wherein the trapezoid support profile includes support protrusions on outsides of the inward oriented slanted surfaces of the trapezoid support profile, and wherein the support protrusions are sized larger at least by a factor of 10, with respect to height or distance, than the support profile protrusions on the inside of the trapezoid support profile and have a rectangular shape and become thicker towards their free ends.

19. The silo closure according to claim 7, wherein the cover foil includes the cover foil protrusions and the cover foil recesses on both outsides of the cover foil.

20. The silo closure according to claim 10, wherein the inflatable support hose is made from an expandable material.

21. The silo closure according to claim 11, wherein the outer diameter is greater than a smallest free distance between two inward oriented slanted surfaces of the trapezoid support profile.

* * * * *